United States Patent
Haakenson et al.

(10) Patent No.: US 11,540,506 B2
(45) Date of Patent: Jan. 3, 2023

(54) LADDER STAND AND ACTIVITY RAIL ASSEMBLY

(71) Applicant: ARDISAM, INC., Cumberland, WI (US)

(72) Inventors: Bryant Haakenson, Amery, WI (US); Michael Furseth, Cumberland, WI (US); Scott Nickell, Cumberland, WI (US); Blake Otto, Gladwin, MI (US)

(73) Assignee: ARDISAM, INC., Cumberland, WI (US)

( * ) Notice: Subject to any disclaimer, the term of this patent is extended or adjusted under 35 U.S.C. 154(b) by 308 days.

(21) Appl. No.: 16/946,299

(22) Filed: Jun. 15, 2020

(65) Prior Publication Data

US 2021/0186001 A1 Jun. 24, 2021

Related U.S. Application Data

(63) Continuation-in-part of application No. 16/724,095, filed on Dec. 20, 2019.

(51) Int. Cl.
*A01M 31/02* (2006.01)
*E06C 1/34* (2006.01)

(52) U.S. Cl.
CPC ............ *A01M 31/025* (2013.01); *E06C 1/34* (2013.01)

(58) Field of Classification Search
CPC ....... A01M 31/025; A01M 31/02; E06C 1/34; E06C 7/06; E06C 7/182; E06C 7/16; E06C 7/188
USPC ............................................................. 43/1
See application file for complete search history.

(56) References Cited

U.S. PATENT DOCUMENTS

| | | | | |
|---|---|---|---|---|
| 5,310,019 A | * | 5/1994 | Paul | A01M 31/02 182/135 |
| 5,580,129 A | * | 12/1996 | Findlay | A47C 4/20 297/344.21 |
| 5,975,389 A | | 11/1999 | Braun et al. | |
| 6,053,278 A | | 4/2000 | Myers | |
| 6,890,033 B1 | * | 5/2005 | Casella | A47C 4/42 297/344.21 |

(Continued)

OTHER PUBLICATIONS

Hawk Hunting , "Hercules Cross Grip Safety System Ladder Stand", URL: https://www.hawkhunting.com/hawk-upgrades-ladder-stands-hercules/, Jan. 10, 2018.

(Continued)

*Primary Examiner* — Muhammad Ijaz
(74) *Attorney, Agent, or Firm* — Perkins Coie LLP

(57) ABSTRACT

A tree stand includes an activity rail assembly rotatably attached to a chair. The activity rail assembly is rotatable among a first stowed position in which the activity rail assembly is oriented upright, a second stowed position in which the activity rail assembly is oriented downwardly, and one or more deployed positions between the first stowed position and the second stowed position. The activity rail assembly is extendable and retractable between a first position and a second position, wherein when the activity rail assembly is in the first position, a horizontal activity rail portion is closer to the chair than when the activity rail assembly is in the second position. The tree stand may further include a platform to support the chair, and, optionally, a ladder portion to support the platform.

17 Claims, 9 Drawing Sheets

(56) References Cited

U.S. PATENT DOCUMENTS

| | | | | |
|---|---|---|---|---|
| 8,167,374 | B2* | 5/2012 | Findlay | A47C 1/0265 |
| | | | | 297/344.21 |
| 8,973,708 | B1* | 3/2015 | Fenner | A01M 31/02 |
| | | | | 182/12 |
| 8,991,555 | B2* | 3/2015 | Furseth | E06C 7/48 |
| | | | | 182/187 |
| 2008/0105490 | A1 | 5/2008 | Butcher | |
| 2009/0229917 | A1* | 9/2009 | Berkbuegler | A01M 31/02 |
| | | | | 182/187 |
| 2013/0248287 | A1* | 9/2013 | Furseth | A01M 31/02 |
| | | | | 182/115 |
| 2015/0129360 | A1 | 5/2015 | Shiver | |
| 2017/0142959 | A1 | 5/2017 | Berkbuegler | |
| 2017/0211904 | A1* | 7/2017 | Matthews | F41A 23/02 |
| 2019/0281812 | A1* | 9/2019 | Lee | E06C 7/14 |
| 2020/0000084 | A1* | 1/2020 | McGucken, III | A47C 3/18 |
| 2020/0336581 | A1* | 10/2020 | Allen | F16M 11/16 |
| 2020/0344997 | A1 | 11/2020 | Berkbuegler | |
| 2020/0383315 | A1* | 12/2020 | Overbaugh | E04G 1/30 |
| 2021/0186000 | A1 | 6/2021 | Haakenson et al. | |

OTHER PUBLICATIONS

Leverage, "5100 Tree Stand Review—Outdoorfreaks.net, YouTube", URL: https://www.youtube.com/watch?v=3SJ2QjMFGdw, Sep. 13, 2012.

Leverage, "Outcast Model 5300 Telescoping Ladder Stand", 2013.

Leverage, "Outcast Telescoping Ladder Stand, YouTube", URL: https://www.youtube.com/watch?v=WK-jIIUUQao, Jun. 6, 2012.

Lock Jawz, "Lockjawz Tree Stands, Facebook Video", URL: https://www.facebook.com/lockjawztreestands/, exact publication date unknown, web page visited Sep. 21, 2020.

Primal Vantage, "Grip Jaw & Backbone Stabilizer Truss System, Web Video", URL: https://www.primaltreestands.com/press/hp2-introducing-the-new-innovative-emergency-descent-device-3, Jul. 23, 2018.

River's Edge Treestands, "Lockdown Ladder Stands from Rivers Edge, YouTube", URL: https://www.youtube.com/watch?v=H2timkvMeTU&t=2s, Dec. 20, 2017.

Rock West Composites, "Telescoping Clamps", URL: https://www.rockwestcomposites.com/shop/connector-accessories/locking-telescoping-mechanisms/telescoping-clamps, website visited Feb. 3, 2021.

Trophy Treestands, "Draw Tight Demo, YouTube", URL: https://www.youtube.com/watch?v=kcbsSHFETjc, Dec. 6, 2019.

Trophy Treestands, "Jaw Safety System Demo 1, YouTube", URL: https://www.youtube.com/watch?v=zv2nOgResSw, Aug. 26, 2019.

Trophy Treestands, "Single Person Ladderstand", URL: https://www.trophytreestands.com/product-page/f-15, exact publication date unknown, web page visited Sep. 16, 2020.

X-Stand, "Jaw Safety System, YouTube", URL: https://www.youtube.com/watch?v=tkP61J1FFEghttps, Aug. 18, 2016.

* cited by examiner

LADDER STAND AND ACTIVITY RAIL ASSEMBLY

CROSS-REFERENCE TO RELATED APPLICATION

The present application is a continuation-in-part of, and claims priority to, pending U.S. patent application Ser. No. 16/724,095, filed Dec. 20, 2019, which is incorporated herein in its entirety by reference.

BACKGROUND

Hunters, wildlife observers, and others use portable seating systems in the form of tree stands to conceal themselves from wildlife or to have an elevated perspective for observing wildlife. Such a tree stand may be permanently or temporarily attached to a support structure, such as a tree. A tree stand advantageously allows a user to carry minimal structure into a remote area and to rely on natural features to support the stand. Some tree stands are capable of being supported entirely by a tree or other support structure and may not include a ladder for climbing up the stand. Some tree stands include ladders that may assist with supporting the tree stand while it is attached to the support structure and that facilitate a user's climb up the stand. Tree stands with ladders may be called ladder stands. Tree stands that hang directly from the support structure (and may optionally exclude a ladder) may be called "hang-on" stands.

Existing ladder stands have several drawbacks. For example, existing stands may not work on trees with branches because installation requires positioning support straps over or around branches. Existing stands that rely on movable jaws to hold a tree may work only on a limited range of tree sizes. Such movable-jaw systems may also be difficult to install or uninstall because the jaws may need to be operated (such as opening or closing) while a user is on an upper platform of the stand, meaning a user may need to climb the stand before it is safely secured to the tree. Existing stands also tend to apply a downward force on the upper attachment point to the tree, which can cause the stand to shift down the tree and become unstable while climbing. Further, existing stands may have only one strap to tighten a tree blade against a tree. Because trees are typically not uniform, having only one strap to tighten the blade against a tree can result in an uneven or twisted contact with the tree.

Some ladder stands include so-called "shooter's rails" or "shooting rails" that may include a bar positioned in front of a user for the user to rest upon to improve stability while holding a rifle, binoculars, or performing another activity. Such "shooter's rails" may also improve safety by enclosing a user at the top of a tree stand. Existing "shooter's rails" have several drawbacks. For example, some existing "shooter's rails" lack sufficient height adjustability or are incapable of being stowed in a manner that does not obstruct the user during activities in which a "shooter's rail" is not used, such as ingress to the tree stand, egress from the tree stand, or bowhunting. Some "shooter's rails" are removable from their corresponding tree stands but such removability may require a user to find a place to store the rail when it is not in use, which presents a risk that a user may drop the rail from the tree stand.

SUMMARY

Representative embodiments of the present technology include a ladder stand having a blade element that is drawn toward a support structure, such as a tree, by two straps that extend from the ladder stand, wrap partially around the tree, and connect to each other at the backside of the tree or otherwise adjacent to the tree to position the tree between the blade element and the straps. The straps may be connected to each other by a connecting device so that a user or installer may pass each strap around the tree individually. By connecting the straps together after passing them around the tree, a user may position the straps to avoid obstructions on the tree before tightening the straps to draw the blade element into the tree. The straps may be positioned to be generally level or horizontal with the blade element to provide a primarily horizontal or perpendicular force to draw the blade element against or into the tree. In some embodiments, a stabilizer bar may be positioned below a platform of the ladder stand, between a ladder portion of the ladder stand and the tree, to further stabilize the ladder stand against the tree.

Representative embodiments of the present technology also include an activity rail assembly rotatably attached to a chair, such as a chair supported by a tree stand or a ladder stand. The activity rail assembly is rotatable among a first stowed position in which the activity rail assembly is oriented upright, a second stowed position in which the activity rail assembly is oriented downwardly, and one or more deployed positions between the first stowed position and the second stowed position. The activity rail assembly is extendable and retractable between a first position and a second position, wherein when the activity rail assembly is in the first position, a horizontal activity rail portion is closer to the chair than when the activity rail assembly is in the second position.

Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the several views:

FIG. 1 also illustrates an activity rail assembly configured in accordance with embodiments of the present technology, in a deployed position.

DETAILED DESCRIPTION

The present technology is directed to ladder stands, activity rail assemblies, and associated systems and methods. Various embodiments of the technology will now be described. The following description provides specific details for a thorough understanding and enabling description of these embodiments. One skilled in the art will understand, however, that the invention may be practiced without many of these details. Additionally, some well-known structures or functions, such as those common to ladder stands, chairs, or ladders, may not be shown or described in detail so as to avoid unnecessarily obscuring the relevant description of the various embodiments. Accordingly, embodiments of the present technology may include additional elements or exclude some of the elements described below with reference to FIGS. 1-9, which illustrate examples of the technology.

The terminology used in this description is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all the items in the list, or (c) any combination of items in the list. Further, unless otherwise specified, terms such as "attached" or "connected" are intended to include integral connections, as well as connections between physically separate components.

Figure 1:
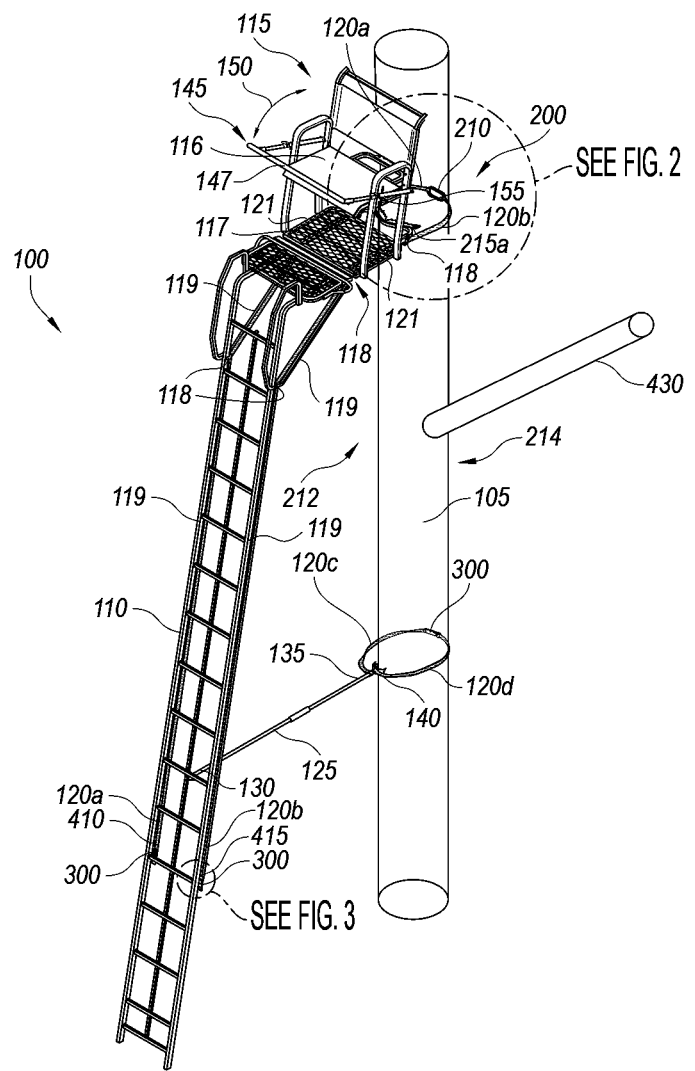
FIG. 1 illustrates a ladder stand configured in accordance with embodiments of the present technology, in a deployed position and attached to a support structure.

FIG. 1 illustrates a ladder stand 100 configured in accordance with embodiments of the present technology, in a deployed position and attached to a support structure 105, which may include a tree, a pole, or another sturdy structure. The ladder stand 100 includes a ladder portion 110 (having a plurality of rungs or steps), a seating portion 115 (which may include a chair 116 supported on a platform 117) supported by the ladder portion 110, and a plurality of support straps (such as four support straps) 120a, 120b, 120c, 120d for securing the ladder stand 100 on the support structure 105.

In some embodiments, the ladder stand 100 includes a stabilizer bar 125, which may be a single bar, a multiple piece bar, or a telescoping bar. The stabilizer bar 125 may be oriented generally horizontally and may be pivotally connected, releasably connected, or otherwise suitably connected to the ladder portion 110 at a first end 130, and engaged with the support structure 105 at a second end 135. In some embodiments, the second end 135 includes one or more spikes 140 for pressing into the support structure 105 (for example, to dig or stab into a tree for a secure connection with the tree). In other embodiments, spikes 140 may be omitted and the second end 135 may frictionally engage the support structure 105. The ladder portion 110 may be collapsible, telescoping, one integral ladder, or another suitable configuration for forming a ladder structure.

In some embodiments, the seating portion 115 may include an activity rail assembly 145. The activity rail assembly 145 may be used as a shooter's rail, as a safety rail, or as a rest-surface for other activities. The activity rail assembly 145 is movable among several stowed and deployed positions for a user to selectively position the activity rail assembly 145 for use in various activities. For example, the activity rail assembly 145 may be rotatable relative to the seating portion 115 along a rotational pathway 150. The activity rail assembly 145 may additionally or alternatively be extendable and retractable. The activity rail assembly 145 may be rotatably attached to part of the seating portion 115. In some embodiments, the activity rail assembly 145 may be rotatably attached to the chair 116. Rotation, extension, and retraction of the activity rail assembly 145 are described in additional detail below with regard to FIGS. 7-9.

FIG. 1 illustrates a deployed position of the activity rail assembly 145. In such a position, the activity rail assembly 145 generally wraps around a user sitting in the chair 116, and portions of the activity rail assembly 145 may hover generally above or directly on a user's lap or knees. For example, the activity rail assembly 145 may include a horizontal activity rail portion 147 that may be positioned in front of a user when the user is in the chair 116 and the activity rail assembly 145 is in a deployed position.

Other representative positions of the activity rail assembly 145 include a first stowed position in which the activity rail assembly 145 is oriented upright (see FIG. 7), a second stowed position in which the activity rail assembly 145 is oriented downwardly (see FIG. 8), and in some embodiments, the activity rail assembly 145 may be oriented in several other deployed positions between the first stowed position and the second stowed position. The chair 116 may include a retaining element 155 positioned to support the activity rail assembly 145 in one or more of the deployed positions. As explained in additional detail below, when the activity rail assembly 145 is in a stowed position, the activity rail assembly 145 may be out of the way of a user during ingress into the seating portion 115, egress from the seating portion 115, or during activities in which an activity rail assembly would be an obstruction to the user.

Figure 2:
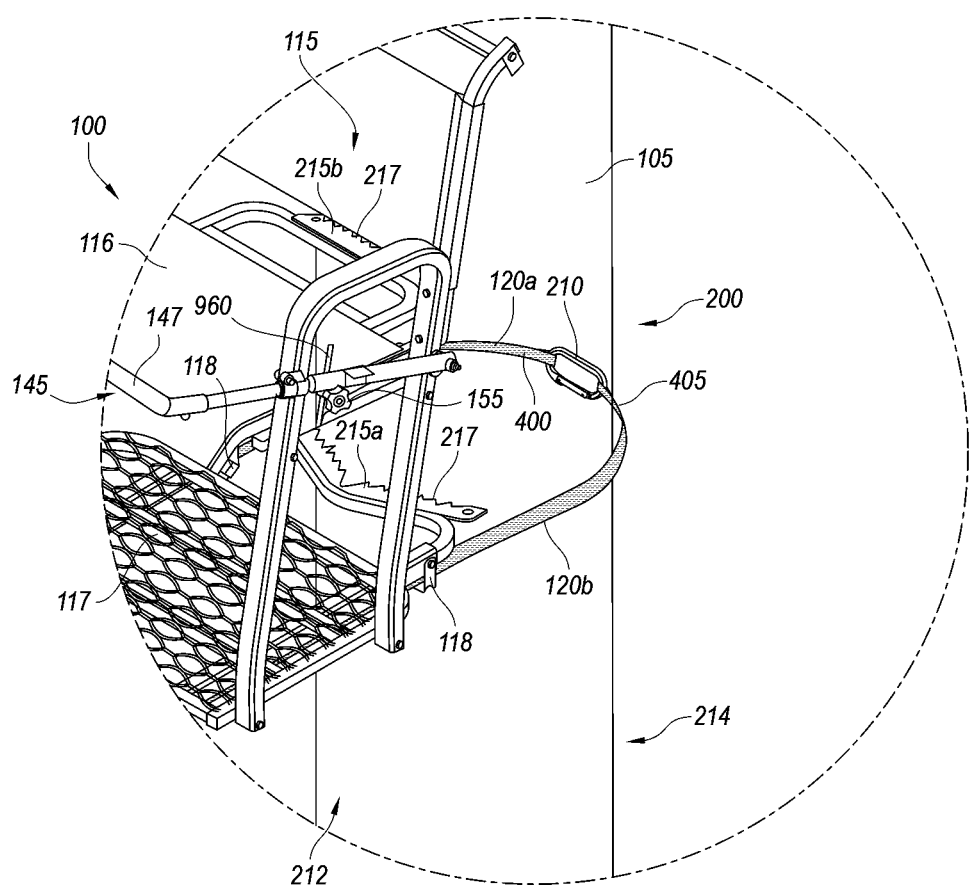
FIG. 2 illustrates a detailed view of a portion of the ladder stand shown in FIG. 1, including an upper connection between the support structure and the ladder stand.

FIG. 2 illustrates a detailed view of a portion of the ladder stand 100, showing an upper connection 200 between the support structure 105 and the ladder stand 100. In some embodiments, a first upper support strap 120a is connected to the ladder stand 100 and wraps partially around the support structure 105, and a second upper support strap 120b is connected to the ladder stand 100 and wraps partially around the support structure 105. The first upper support strap 120a and the second upper support strap 120b may be connected to each other with a connecting device 210.

The ladder stand 100 may be positioned on a first side 212 (such as the front) of the support structure 105, and the connecting device 210 may be positioned on a second side 214 (such as the back) of the support structure 105, opposite the first side 212, or the connecting device 210 may be positioned elsewhere as long as it connects the first and second upper support straps 120a, 120b such that they together wrap around the support structure 105. The connecting device 210 joins the first and second upper support straps 120a, 120b such that they together wrap around the support structure 105 to secure the ladder stand 100 to the support structure 105.

The ladder stand 100 may include one or more blade elements (such as two blade elements, or more blade elements) 215a, 215b. In some embodiments, the blade elements are carried by the seating portion 115 (for example, attached to the chair 116 or the platform 117, or otherwise supported by the platform 117). The blade elements 215a, 215b may include teeth 217 (such as serrations or spikes) for digging or stabbing into the support structure 105. For example, as described in additional detail below, the upper support straps 120a, 120b may be tightened against the support structure 105 to cause a primary blade element 215a (such as a lowermost blade element attached to the platform 117) to press against or into the support structure 105.

Embodiments of the present technology advantageously allow the upper support straps 120a, 120b to create a force that is generally perpendicular to the support structure 105 (such as a horizontal force), as opposed to a force that is oriented at a generally oblique angle relative to the support structure 105. In other words, in some embodiments, the primary blade element 215a and the upper support straps 120a, 120b are positioned to be generally parallel when one or more tensioning devices 300 (described below) apply tension to the upper support straps 120a, 120b so that the primary blade element 215a is positioned and configured to apply a generally horizontal force against or into the support structure 105. Such a perpendicular or horizontal force aids the primary blade element 215a in gripping the support structure 105 and avoids an undesirable upward or downward force on the remainder of the ladder stand 100. This provides improved stability and reliability in the connection between the ladder stand 100 (specifically, the primary blade element 215a) and the support structure 105. Such improved stability and reliability facilitates a safe pre-climb installation process and provides a stable ladder stand 100 that a user can safely climb to complete installation (such as fastening additional straps), as explained in additional detail below.

Figure 3:
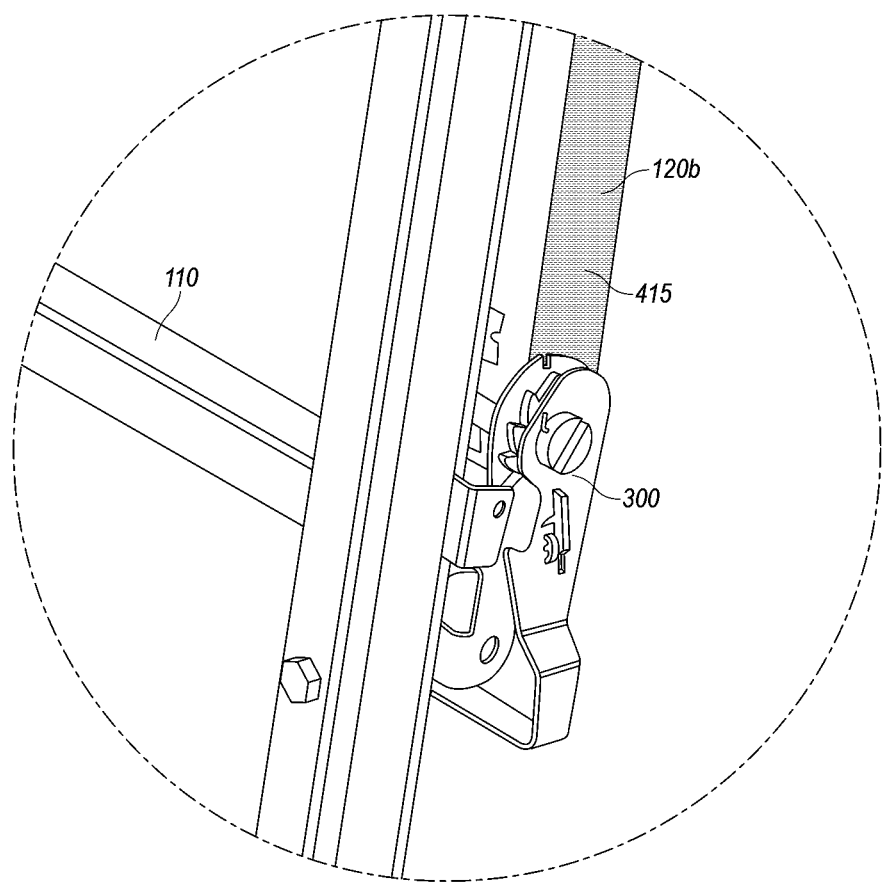
FIG. 3 illustrates a detailed view of a portion of the ladder stand shown in FIG. 1, including a tensioning device attached to the ladder portion and operable to tension an upper support strap, in accordance with embodiments of the present technology.

FIG. 3 illustrates a detailed view of a portion of the ladder stand 100, showing a tensioning device 300 attached to the ladder portion 110 (or otherwise supported by the ladder portion 110) and operable to tighten the second upper support strap 120b, in accordance with embodiments of the present technology. FIG. 3 shows only one side of the ladder portion 110, the second upper support strap (120b), and one tensioning device 300, but FIG. 1 illustrates another tensioning device 300 attached to the other side of the ladder portion 110 and operable to tighten the first upper support strap 120a. In some embodiments, the tensioning devices 300 may include a ratchet device for applying tension to the upper support straps 120a, 120b. Although two tensioning devices 300 are shown in the figures, in some embodiments, more or fewer tensioning devices may be used. For example, one single tensioning device 300 may be implemented to tighten both upper support straps 120a, 120b. The one or more tensioning devices 300 are operable to tighten the upper support straps 120a, 120b to draw the blade elements (such as the primary blade element 215a) against or into the support structure 105.

With reference to FIG. 1, the upper support straps 120a, 120b, which are connected together by the connecting device 210, extend along the platform 117, down the ladder portion 110, to the tensioning devices 300 for a user to tighten the support straps 120a, 120b from a user's position on the ground. In some embodiments, the upper support straps 120a, 120b may be supported by one or more strap supports 118 (such as hooks or loops) attached to the platform 117. In some embodiments, the upper support straps 120a, 120b may be supported by one or more additional strap supports 118 attached to the ladder portion 110. In some embodiments, the straps 120a, 120b may be partially concealed by passing them through or within one or more ladder rails 119 or one or more platform rails 121.

With reference to FIGS. 1 and 2, in some embodiments, the ladder stand 100 may include one or more additional straps and tensioning devices to tighten the ladder stand 100 against the support structure 105, such as one or more additional straps and tensioning devices adjacent to a secondary blade element 215b. Such additional straps may be installed or tightened after the upper support straps 120a, 120b are tightened against the support structure 105. A user may climb the ladder stand 100 after the upper support straps 120a, 120b are tightened, and then a user may install or tighten additional straps.

Although the blade elements 215a, 215b are described as including teeth 217, in some embodiments, the blade elements 215a, 215b may be replaced with, or may include, another suitable structure configured to grip the ladder stand 100 against the support structure 105 when the upper support straps 120a, 120b are tightened against the support structure 105. For example, a gripping structure may include a surface that does not include teeth or spikes but instead is a smooth blade or broad surface that relies on friction against the support structure 105.

With reference to FIG. 1, and as described in additional detail below with regard to FIG. 6, lower support straps 120c, 120d may be connected to the second end 135 of the stabilizer bar 125, wrapped around the support structure 105, and connected together with a tensioning device 300. The tensioning device 300 is operable to tighten the lower support straps 120c, 120d to pull the one or more spikes 140 into the support structure 105 or to otherwise pull the second end 135 against the support structure 105.

Figure 4:
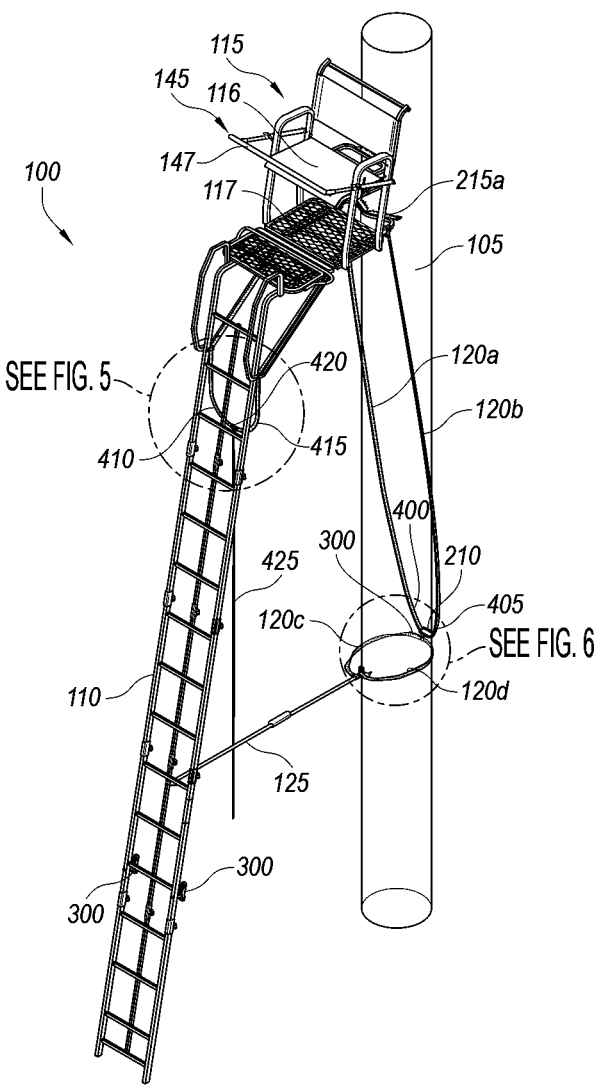
FIG. 4 illustrates the ladder stand shown in FIGS. 1-3 in a pre-climb and pre-installation configuration, in order to illustrate an installation procedure in accordance with embodiments of the present technology.
Figure 5:
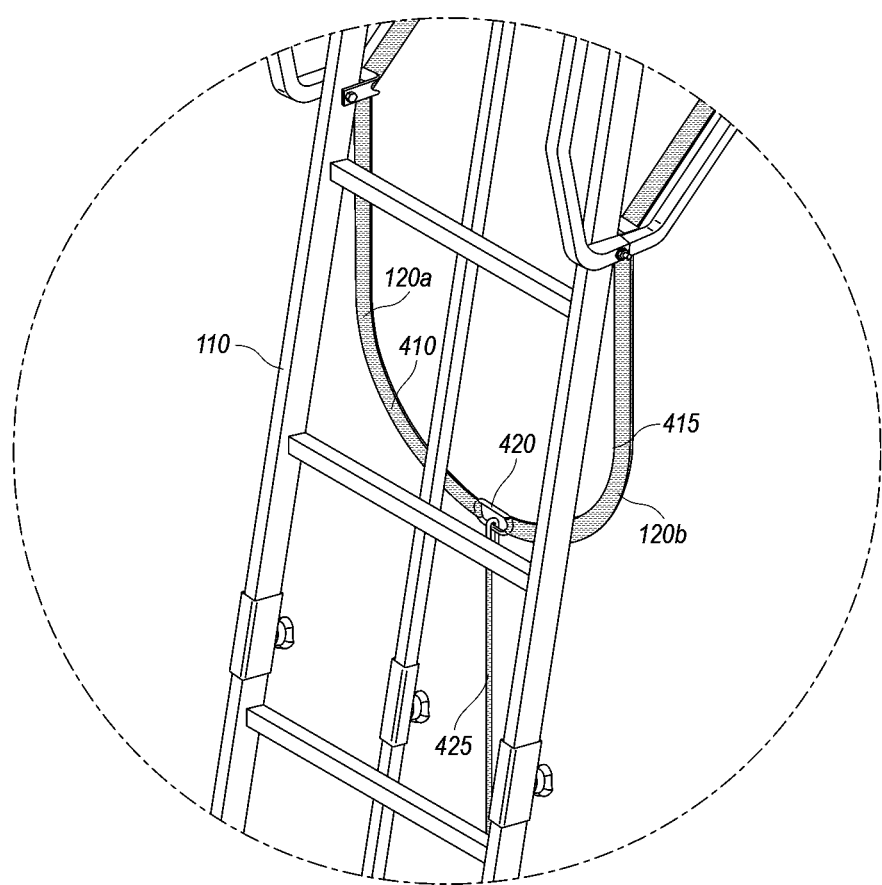
FIG. 5 is a detailed view of a portion of the ladder stand shown in FIG. 4.

FIG. 4 illustrates the ladder stand 100 in a pre-climb and pre-installation configuration, in order to illustrate an installation procedure in accordance with embodiments of the present technology. FIG. 5 is a detailed view of a portion of the ladder stand 100 shown in FIG. 4. FIG. 6 is a detailed view of another portion of the ladder stand 100 shown in FIG. 4. With reference to FIGS. 4-6, embodiments of the present technology include methods of installing a ladder stand against a support structure.

In some embodiments, a user raises the ladder portion 110 and the seating portion 115 to lean against the support structure 105. The user may pass a first end 400 of the first upper support strap 120a and a first end 405 of the second upper support strap 120b around the support structure 105. The user may then connect the first end 400 of the first upper support strap 120a to the first end 405 of the second upper support strap 120b using the connecting device 210. In some embodiments, the connecting device 210 may be a carabiner, a hook, a knot tying the first ends 400, 405 together (directly or with an intermediate tying element), or another suitable device to join the first ends 400, 405. It is preferable that the connecting device 210 is a releasable device, but in other embodiments, it may be permanent (for example, if installation of the ladder stand 100 is intended to be permanent). When the first end 400 of the first upper support strap 120a is connected to the first end 405 of the second upper support strap 120b, the support structure 105 is positioned between the first upper support strap 120a, the second upper support strap 120b, and the primary blade element 215a.

To tighten the connected upper support straps 120a, 120b against the support structure 105, a user may pull a second end 410 of the first upper support strap 120a and a second end 415 of the second upper support strap 120b. By pulling the second ends 410, 415 of the upper support straps 120a, 120b, the upper support straps 120a, 120b are put under tension, the connecting device 210 moves upward along the support structure 105, and eventually becomes generally level with the primary blade element 215a (for example, the connecting device 210 and the first ends 400, 405 move from a position shown in FIGS. 4 and 6, to a position shown in FIGS. 1 and 2). Continued tension on the upper support straps 120a, 120b draws the primary blade element 215a against or into the support structure 105 to provide a secure connection between the ladder stand 100 and the support structure 105.

In some embodiments, to assist a user in pulling down on the second ends 410, 415 of the upper support straps 120a, 120b to apply tension, the second ends 410, 415 may be connected to each other using a connecting device 420, which may be a connecting device such as a carabiner, a hook, a knot tying the second ends 410, 415 together (directly or with an intermediate tying element), or another suitable device to join the second ends 410, 415. It is preferable that the connecting device 420 is a releasable device, but in some embodiments, it may be permanent. In some embodiments, a cord 425 may be connected to the second ends 410, 415 of the upper support straps 120a, 120b such that it hangs near the ground (at a lower height, below the platform 117). Such a cord 425 may be positioned and configured to allow a user to reach the cord 425 to aid in pulling the upper support straps 120a, 120b while tensioning the upper support straps 120a, 120b (for example, by pulling the cord 425 downward). In some embodiments, when the upper support straps 120a, 120b are in a tensioned configuration, or the connecting device 210 attached to the first ends 400, 405 of the upper support straps 120a, 120b has generally reached the height of the primary blade element 215a, a user may disconnect the connecting device 420 to remove the cord 425 and separate the second ends 410, 415 of the upper support straps 120a, 120b. Each of the second ends 410, 415 of the upper support straps 120a, 120b may be passed through or into a corresponding tensioning device 300 on the ladder portion 110, and the upper support straps 120a, 120b may be further tensioned using the tensioning devices 300. In some embodiments, the second ends 410, 415 of the upper support straps 120a, 120b may be passed into the same tensioning device 300 to tension the upper support straps 120a, 120b.

Returning to FIG. 1, which illustrates the upper support straps 120a, 120b in a tensioned configuration, the upper support straps 120a, 120b may be tensioned individually and to different levels of tension (for example, when each upper support strap 120a, 120b is tightened by its own corresponding tensioning device 300, as illustrated in FIG. 1). Preferably, the upper support straps 120a, 120b do not cross each other on the second side 214 (the back side) of the support structure 105, opposite the remainder of the ladder stand 100. An advantage of embodiments of the present technology is that the separate upper support straps 120a, 120b (which may only be connected to each other on the second side 214 (the back side) of the support structure 105 opposite the remainder of the ladder stand 100 via the connecting device 210 at the first ends 400, 405) can be tensioned individually to adapt to support structures 105 (such as trees) that have uneven shapes. A user may tighten each support strap 120a, 120b independently from the other to ensure a desired level of contact between the primary blade element 215a and the support structure 105. More specifically, trees are not uniform, and embodiments of the present technology avoid problems with existing tree stands that often have uneven contact with support structures.

Another advantage of ladder stands configured in accordance with embodiments of the present technology is the ability to pass over or around obstructions extending from support structures 105, such as tree branches. For example, FIG. 1 shows an obstruction 430 extending from the support structure 105. Because the upper support straps 120a, 120b are separable from each other and connectable using the connecting device 210, a user may toss (or otherwise pass) one or both first ends 400, 405 of the upper support straps 120a, 120b over the obstruction 430 to position both first ends 400, 405 on the same side of the obstruction. In some embodiments, a user may hoist one or both first ends 400, 405 over the obstruction using the stabilizer bar 125 as a tool. When the first ends 400, 405 are on the same side of the obstruction 430, the first ends 400, 405 may be connected to each other using the connecting device 210, after which a user may tension the upper support straps 120a, 120b to pull the connecting device 210 and the first ends 400, 405 into position (such as the position illustrated in FIG. 1), bypassing the obstruction 430.

Figure 6:
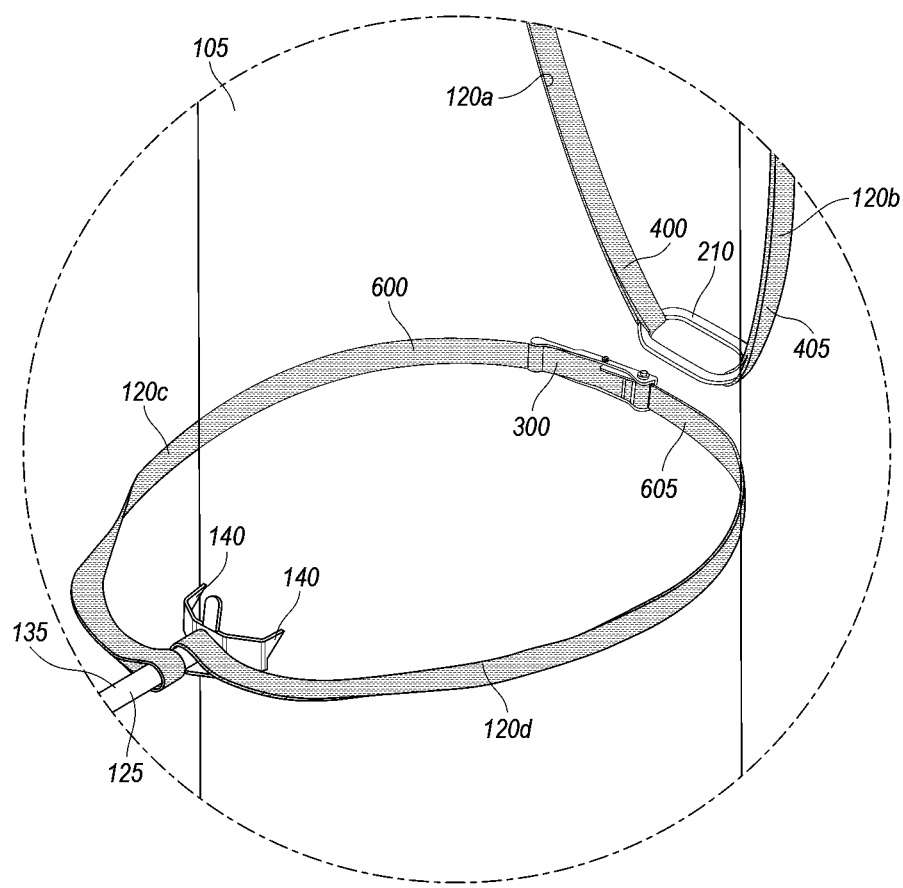
FIG. 6 is a detailed view of another portion of the ladder stand shown in FIG. 4.

With reference to FIG. 6, a tensioning device 300 may connect first ends 600, 605 of the lower support straps 120c, 120d such that the lower support straps 120c, 120d wrap around the support structure 105. The tensioning device 300, which may be similar to other tensioning devices described herein, may tighten the lower support straps 120c, 120d to draw the stabilizer bar 125 toward the support structure 105. With reference to FIGS. 1 and 4, the stabilizer bar 125 passes from the ladder portion 110 to the support structure 105 to further stabilize the ladder stand 100.

Some embodiments of the present technology include a kit of parts for assembling or installing a ladder stand. Kits of parts in accordance with embodiments of the present technology include some or all of a variety of the elements of a ladder stand described herein. For example, a kit of parts may include a ladder portion, a seating portion, a plurality of straps, one or more connecting devices, one or more tensioning devices, one or more cords, a stabilizer bar, or other components.

Ladder stands configured in accordance with embodiments of the present technology improve safety by facilitating a stable attachment to support structures before a user climbs the ladder stand to complete assembly (completing assembly may include adding further support straps to draw a secondary blade element 215b against or into the support structure). Ladder stands configured in accordance with embodiments of the present technology further facilitate stability in the installation process by applying a generally horizontal force against or into the support structure, rather than a generally downward force.

Figure 7:
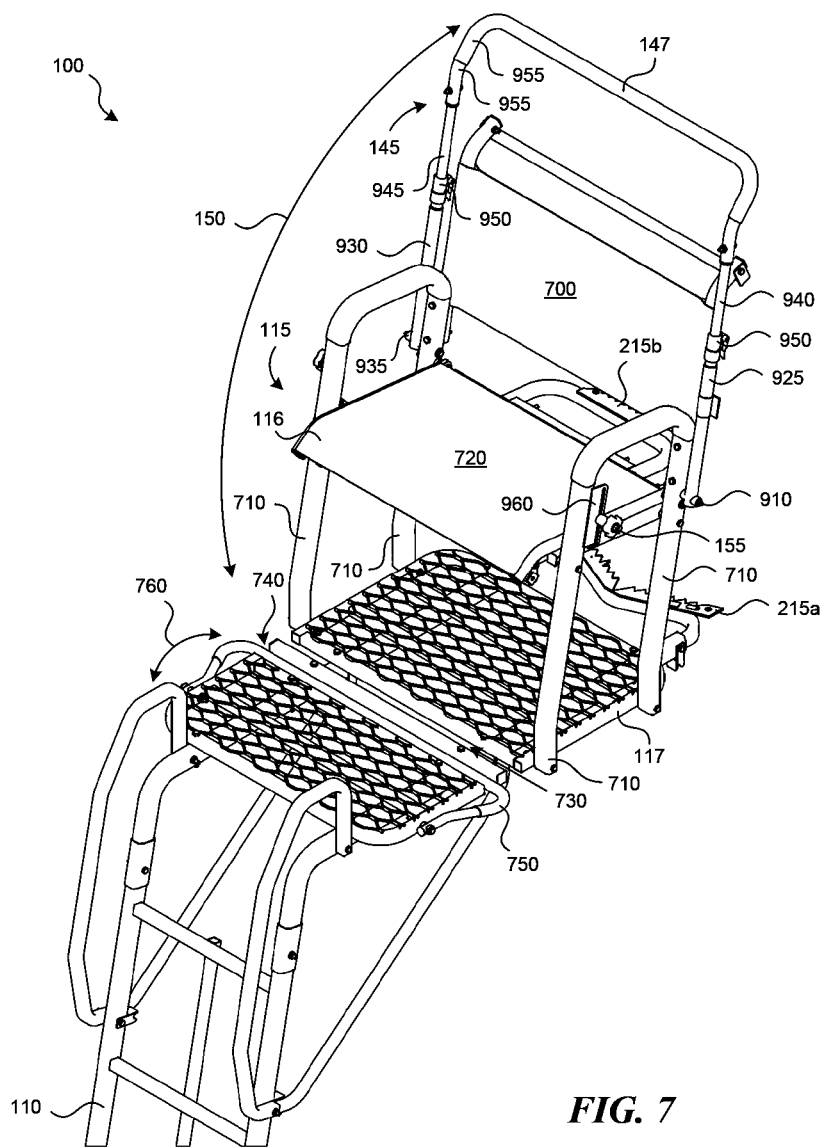
FIG. 7 illustrates a seating portion including an activity rail assembly configured in accordance with embodiments of the present technology, with the activity rail assembly positioned in a stowed-up (rotated-up) position.

FIG. 7 illustrates the seating portion 115 with the activity rail assembly 145 positioned in a stowed-up (rotated-up) position. In some embodiments, the stowed-up position includes the activity rail assembly 145 aligned with or behind a back portion 700 of the chair 116. Generally, in the stowed-up position, the activity rail assembly 145 is rotated along the rotational pathway 150 to a position out of the way of (such as behind) a user. In the stowed-up position, a user may access the chair 116 without obstruction by the activity rail assembly 145, or a user may perform activities on the chair 116 or the platform 117 with minimal obstruction (or no obstruction) from the activity rail assembly 145. FIG. 7 also illustrates the retaining element 155 in a position ready to support the activity rail assembly 145 when the activity rail assembly 145 is rotated down along pathway 150 to the deployed position (see FIGS. 1 and 9).

In some embodiments, the chair 116 may include multiple elements, such as one or more legs 710 supporting a seating surface 720, the back portion 700, and other features suitable for accommodating a user. In some embodiments, the legs 710 may be attached to the platform 117.

The platform 117 may optionally include a slot 730 positioned to receive a portion of the activity rail assembly 145 when the activity rail assembly 145 is in a stowed-down (rotated-down) position, as explained in additional detail below with regard to FIG. 8. A similar slot 740 is shown in FIG. 7 with part of an optional rotatable footrest 750 positioned in the slot 740. The footrest 750 may be rotatably attached to the platform 117 to rotate along a rotation path 760 between a stowed position (FIG. 7) and a deployed position in which a user may rest feet or toes on the footrest 750.

Figure 8:
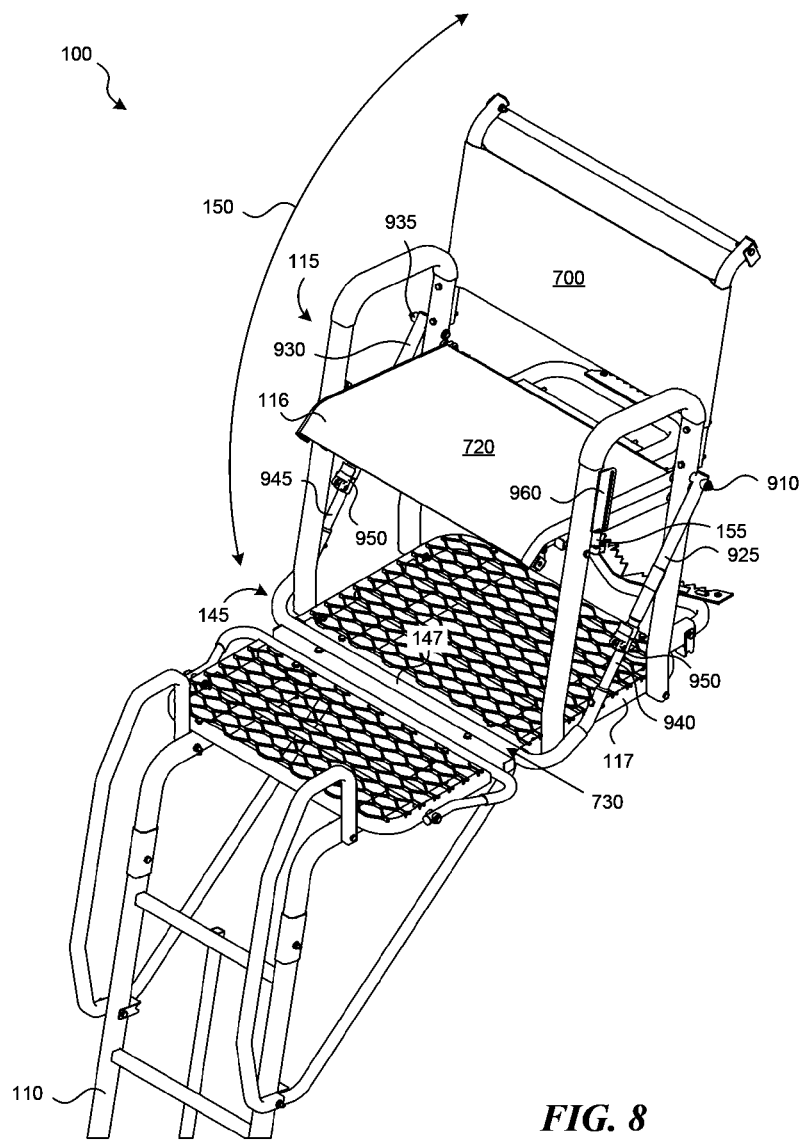
FIG. 8 illustrates the seating portion shown in FIGS. 1 and 7, with the activity rail assembly positioned in a stowed-down (rotated-down) position.

FIG. 8 illustrates the seating portion 115 with the activity rail assembly 145 positioned in a stowed-down (rotated-down) position. In some embodiments, a portion of the activity rail assembly 145 (such as part of the horizontal activity rail portion 147) may be positioned in the slot 730 such that the portion of the activity rail assembly 145 is generally flush or below flush relative to the platform 117. In such a configuration, the activity rail assembly 145 is generally out of the way of the user and does not present a tripping hazard or other hazard. In some embodiments, the platform 117 may not include a slot 730 and portions of the activity rail assembly 145 (such as the horizontal activity rail portion 147) may not be flush or below flush with the platform 117. Rather, they may simply rest on or above the platform 117 or anywhere below the seating surface 720 when the activity rail assembly 145 is in the stowed-down (rotated down) position.

Figure 9:
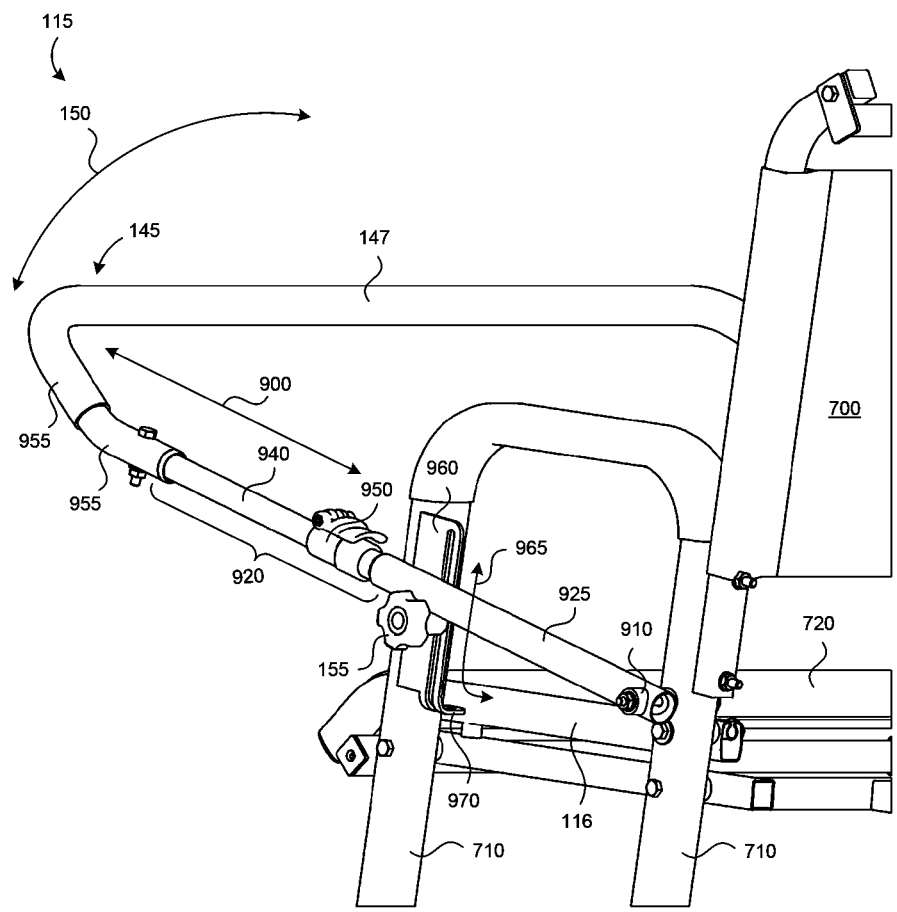
FIG. 9 illustrates a rear side perspective view of part of the seating portion shown in FIGS. 1, 7, and 8, with the activity rail assembly positioned in a deployed position.

FIG. 9 illustrates a rear side perspective view of part of the seating portion 115, with the activity rail assembly 145 in the deployed position also shown in FIG. 1. In some embodiments, the activity rail assembly 145 is extendable and retractable along a direction 900 between a first position in which the horizontal activity rail portion 147 is closer to the chair 116 (specifically, closer to a pivot point 910 about which the activity rail assembly 145 rotates), than when the activity rail assembly 145 is in a second position. The activity rail assembly 145 includes a mechanism for extending and retracting the activity rail assembly 145, such as a telescoping mechanism 920.

With reference to FIGS. 7-9, the telescoping mechanism 920 and the overall activity rail assembly 145 include a plurality of telescoping tubes. For example, the telescoping mechanism 920 may include a first tube 925 rotatably attached to the chair on a first side of the chair (at pivot point 910), a second tube 930 rotatably attached to the chair on a second side of the chair opposite the first side (at a pivot point 935), a third tube 940 telescopically positioned at least partially inside the first tube 925 and configured to slide within the first tube 925, and a fourth tube 945 telescopically positioned at least partially inside the second tube 930 and configured to slide within the second tube 930. The telescoping nature of the activity rail assembly 145 allows a user to adjust the position of the horizontal activity rail portion 147 (such as the distance from the user or the chair 116 to the horizontal activity rail portion 147). The telescoping nature of the activity rail assembly 145 also aids with positioning the horizontal activity rail portion 147 in the slot 730 (see FIG. 8). For example, a user may telescopically adjust the activity rail assembly 145 before or while lowering the activity rail assembly 145 into the stowed-down (rotated down) position (see FIG. 8).

In some embodiments, the telescoping mechanism 920 may include one or more mechanisms 950 for locking one or more of the telescoping tubes relative to each other. The mechanisms 950 for locking the telescoping mechanism 920 may include a mechanism 950 for locking the third tube 940 relative to the first tube 925 or a mechanism 950 for locking the fourth tube 945 relative to the second tube 930. Mechanism 950 may include a clamp (a representative clamp is illustrated in FIGS. 7-9), one or more pins, one or more detent mechanisms, or other suitable devices for resisting or preventing telescopic motion between the tubes 925, 930, 940, 945. The mechanism 950 may hold the activity rail assembly 145 in the first position in which the horizontal activity rail portion 147 is closer to the chair 116 (specifically, closer to the pivot points 910, 935 about which the activity rail assembly 145 rotates), in the second position in which the horizontal activity rail 147 is farther from the chair 116 (farther from the pivot points 910, 935), or in one or more intermediate third positions between the first and second extended positions.

The horizontal activity rail portion 147 extends between the third tube 940 and the fourth tube 945. In some embodiments, the horizontal activity rail portion 147 may be connected to the third tube 940 and the fourth tube 945 with one or more intermediate connecting elements or connecting tube portions 955.

As explained above, the chair 116 may include a retaining element 155 positioned to support the activity rail assembly 145 in one or more of the deployed positions. FIG. 7 illustrates the retaining element 155 in a position where it is ready to support the activity rail assembly 145 when the activity rail assembly 145 is rotated down to a deployed position. FIGS. 1 and 9 illustrate the retaining element 155 in a position where it is supporting the activity rail assembly 145 in a deployed position. FIG. 8 illustrates that the retaining element 155 may be positioned out of the way of the rotational path 150 of the activity rail 145 such that it does not support the activity rail assembly 145. Accordingly, the retaining element 155 may be movable between (a) retaining element positions in which it may support the activity rail assembly 145 in a deployed position and (b) retaining element positions in which it is out of the way of the rotational path 150 of the activity rail assembly 145 and in which it does not support the activity rail assembly 145.

With reference to FIG. 9 (and FIGS. 2, 7, and 8), one or both lateral sides of the chair 116 may include a track element 960. The track element 960 may include a track, a slot, or another device with which the retaining element 155 is movably or slidably engaged to allow the retaining element 155 to move or slide between several positions (for example, the retaining element 155 may move along pathway 965). The several positions provided by the track element 960 allow a user to adjust the height or angle of the activity rail assembly 145 in various alternative deployed positions. In some embodiments, the retaining element 155 includes a knob that tightens against the track element 960 (for example, using a threaded element extending from the knob that engages a threaded element in the track or adjacent to the track). For example, the retaining element 155 may include a threaded bolt that passes through the track element 960 and engages a threaded nut to tighten the retaining element 155 against the track element 960.

One or more of the track elements 960 may be curved or bent such that it extends in a generally vertical direction along a side of the chair 116 and also in a generally horizontal direction away from the rotational pathway 150 of the activity rail assembly 145. The shape of the track element 960 allows the retaining element 155 to be positioned on a generally horizontal (or otherwise angled) portion 970 of the track element 960 where the retaining element 155 is clear of the rotational pathway 150 of the activity rail assembly 145, or where the retaining element 155 is otherwise in a position to not obstruct the rotational pathway 150. When the retaining element 155 is clear of the rotational pathway 150 of the activity rail assembly 145 (as shown in FIG. 8), the activity rail assembly 145 is free to rotate along the rotational pathway 150 between the stowed-up (FIG. 7) and stowed-down (FIG. 8) positions.

Although the retaining element 155 is illustrated as a knob sliding in a track element 960, in some embodiments, the retaining element 155 may include a pin, a bolt, a screw, or another suitable retaining element, and it may be positioned in one or more holes or detents in the track element 960 as opposed to sliding in or along a track or slot. In some embodiments, the retaining element 155 may additionally or alternatively be a spring-loaded device in which the spring provides force to hold the retaining element 155 in its selected position.

Some embodiments of the present technology include kits of parts for assembling or installing an activity rail assembly 145 on a chair or a tree stand. Kits of parts in accordance with embodiments of the present technology include some or all of a variety of the elements of an activity rail assembly 145 or a tree stand described herein. For example, a kit of parts may include one or more tubes, connecting tube portions, a horizontal activity rail portion 147, a telescoping mechanism 920, a mechanism 950 for locking the telescoping mechanism 920, a retaining element 155 (such as a knob), a track element 960, fasteners for attaching the activity rail assembly 145 to the chair 116 or tree stand, or other components. In some embodiments, a user may install activity rail assemblies 145 to existing chairs or tree stands using suitable tools and fasteners that facilitate the rotation of an activity rail assembly 145 configured in accordance with embodiments of the present technology. A kit of parts may include parts for assembling or installing a tree or ladder stand with an activity rail assembly 145 configured in accordance with embodiments of the present technology.

Activity rail assemblies configured in accordance with embodiments of the present technology provide adjustability, stowability, and deployability in order to be adapted for various activities, or for storage during periods of non-use. For example, activity rail assemblies configured in accordance with embodiments of the present technology may be deployed and used as a shooter's rail or other rest-surface to improve stability during activities, or as a safety rail, and they may be stowed out of the way for other activities, such as archery, bowhunting, ingress, or egress. Movement of activity rail assemblies configured in accordance with embodiments of the present technology also allows a user to climb a ladder stand and reach a seated position without having to unhook a safety tether, because the user activity rail assemblies may be moved out of the way of such a safety tether during ingress or egress.

From the foregoing, it will be appreciated that specific embodiments of the presently disclosed technology have been described herein for purposes of illustration, but that various modifications may be made without deviating from the scope of the technology. For example, ladder stands and components thereof configured in accordance with embodiments of the present technology may include more or fewer support straps, they may omit a chair (instead having a generally bare platform supported on the ladder portion), they may have another seating, standing, or housing structure on the platform instead of (or in addition to) a chair portion, they may be foldable, collapsible, or able to be disassembled, they may be made of various materials (metals, plastics, composites, or other materials), they may include additional support structure, or they may include steps or stairs instead of ladder rungs. Although a chair with arms and a back is illustrated in the figures, the term "chair" is understood to include a bench without arms or a back, or another suitable seating surface.

Although preferred embodiments of the present technology include upper support straps 120*a*, 120*b* that are separable from each other and connectable using the connecting device 210 (in order to avoid obstructions, for example), in some embodiments, the upper support straps 120*a*, 120*b* may be combined in a single integral support strap. For example, a single integral support strap may extend between free ends that correspond to the first ends 400, 405, which may be connected together using a connecting device 210, and then the strap may be tightened in a manner similar to the separable upper support straps 120*a*, 120*b* (e.g., by passing the single support strap through one or more tightening devices 300). In some embodiments, a single integral support strap may extend between free ends that correspond to the second ends 410, 415 (such that the strap may be continuous as it wraps around the tree), although such a single integral support strap may not provide the advantages of separate upper support straps 120*a*, 120*b* (such as the ability to pass over or around an obstruction).

Although the activity rail assembly 145 is disclosed having a telescoping mechanism 920, the activity rail assembly 145 may include other mechanisms or arrangements for facilitating extension and retraction. In some embodiments a locking mechanism may reside on only one side of the chair 116. In some embodiments, a telescoping mechanism 920 for the activity rail assembly 145 may include additional telescoping tubes or locking mechanisms. For example, a side of the activity rail assembly 145 may include three or more telescoping tubes. In some embodiments, the horizontal activity rail portion 147 or another part of the activity rail assembly 145 may include a table or a working surface.

Although the activity rail assembly 145 is illustrated in connection with ladder stands (tree stands with ladders), in some embodiments, activity rail assemblies configured in accordance with the present technology may be implemented in other types of stands, such as stands that do not include ladders, ropes, or other means to access the stand from the ground, or in stands that hang directly from the support structure (hang-on stands), or in freestanding stands that do not require an existing support structure. Further, although activity rail assemblies have been described herein in the context of a seating portion or chair on a stand, in some embodiments, activity rail assemblies may be implemented in other seating structures, regardless of whether they are part of a stand. For example, a seating structure configured in accordance with embodiments of the present technology may include an activity rail assembly attached to a chair, which may optionally be supported by a platform or other elements of stands. Although the term "tree stand" includes the word "tree," for the purposes of the present disclosure, the term "tree stand" includes stands that are supported by trees, poles, walls, or other support structures, regardless of whether the support structure is a tree.

Certain aspects of the technology described in the context of particular embodiments may be combined or eliminated in other embodiments. Further, while advantages associated with certain embodiments of the presently disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A tree stand comprising:
 a ladder portion;
 a platform supported on the ladder portion, the platform having a slot;
 a chair supported on the platform; and
 an activity rail assembly rotatably attached to the chair, the activity rail assembly having a horizontal activity rail portion; wherein
 the activity rail assembly is rotatable among a first stowed position in which the activity rail assembly is oriented upright, a second stowed position in which the activity rail assembly is oriented downwardly and a portion of the activity rail assembly is positioned in the slot, and one or more deployed positions between the first stowed position and the second stowed position; and
 the activity rail assembly is extendable and retractable between a first position and a second position, wherein when the activity rail assembly is in the first position, the horizontal activity rail portion is closer to the chair than when the activity rail assembly is in the second position.

2. The tree stand of claim 1, wherein the activity rail assembly comprises a telescoping mechanism for extending and retracting the activity rail assembly between the first and second positions.

3. The tree stand of claim 2, wherein the activity rail assembly comprises a means for locking the telescoping mechanism to hold the activity rail assembly in the first position, in the second position, or in a third position between the first and second positions.

4. The tree stand of claim 3, wherein the means for locking the telescoping mechanism comprises a clamp.

5. The tree stand of claim 1, further comprising a retaining element supported by the chair, wherein the retaining element is movable between a first retaining element position in which the retaining element does not support the activity rail assembly, and a second retaining element position in which the retaining element supports the activity rail assembly in one of the one or more deployed positions.

6. The tree stand of claim 5, wherein the one or more deployed positions comprises a plurality of deployed positions, and wherein the retaining element is movable to one or more additional retaining element positions in which the retaining element supports the activity rail assembly in one or more alternative deployed positions of the plurality of deployed positions.

7. The tree stand of claim 5, further comprising a track element, wherein the retaining element is movable along the track element between the first and second retaining element positions.

8. The tree stand of claim 7, wherein the track element is curved or bent, and wherein when the retaining element is in the first retaining element position, the retaining element is clear of a pathway of the activity rail assembly between the first stowed position and the second stowed position.

9. The tree stand of claim 5, wherein the retaining element comprises a knob.

10. A stand comprising:
 a platform;
 a chair supported on the platform; and
 an activity rail assembly rotatably attached to the chair, the activity rail assembly having a horizontal activity rail portion; wherein:
 the activity rail assembly is rotatable among a first stowed position in which the activity rail assembly is oriented upright, a second stowed position in which the activity rail assembly is oriented downwardly, and one or more deployed positions between the first stowed position and the second stowed position;
 the activity rail assembly is extendable and retractable between a first position and a second position, wherein when the activity rail assembly is in the first position, the horizontal activity rail portion is closer to the chair than when the activity rail assembly is in the second position; and
 the platform comprises a slot positioned to receive a portion of the activity rail assembly, wherein when the activity rail assembly is in the second stowed position, the portion of the activity rail assembly is positioned in the slot.

11. The stand of claim 10, wherein the activity rail assembly comprises a telescoping mechanism for extending and retracting the activity rail assembly between the first and second positions.

12. The stand of claim 10, wherein the activity rail assembly comprises a means for locking the activity rail assembly in the first position, in the second position, or in a third position between the first position and the second position.

13. The stand of claim 10, further comprising:
 a retaining element supported by the chair, wherein the retaining element is movable between a first retaining element position in which the retaining element does not support the activity rail assembly, and a second retaining element position in which the retaining element supports the activity rail assembly in one of the deployed positions; and
 a track element supported by the chair, wherein the retaining element is movable along the track element between the first and second retaining element positions, and wherein when the retaining element is in the first retaining element position, the retaining element is clear of a pathway of the activity rail assembly between the first stowed position and the second stowed position.

14. The stand of claim 10, further comprising a ladder portion, wherein the platform is supported on the ladder portion.

15. A seating structure, comprising:
 a chair;
 a platform, wherein the platform supports the chair; and
 an activity rail assembly rotatably attached to the chair, the activity rail assembly having a horizontal activity rail portion and a mechanism for extending and retracting the activity rail assembly; wherein:
 the activity rail assembly is rotatable among a first stowed position in which the activity rail assembly is oriented upright, a second stowed position in which the activity rail assembly is oriented downwardly, and one or more deployed positions between the first stowed position and the second stowed position;
 the activity rail assembly is extendable and retractable between a first position and a second position, wherein when the activity rail assembly is in the first position, the horizontal activity rail portion is closer to the chair than when the activity rail assembly is in the second position; and the platform comprises a slot positioned to receive a portion of the horizontal activity rail portion, wherein when the activity rail assembly is in the second stowed position, the portion of the horizontal activity rail portion is positioned in the slot.

16. The seating structure of claim 15, further comprising:

a track element supported by the chair and extending between a first location on a side of the chair and a second location different from the first location;

a knob slidably engaged with the track element and being movable along the track element between the first location and the second location, and wherein when the knob is in the second location, the knob does not obstruct a pathway of the activity rail assembly, and wherein when the knob is in the first location, the knob supports the activity rail assembly in one of the one or more deployed positions.

17. The seating structure of claim 15, wherein the activity rail assembly comprises:

a first tube rotatably attached to the chair on a first side of the chair;

a second tube rotatably attached to the chair on a second side of the chair opposite the first side;

a third tube telescopically positioned at least partially inside the first tube and configured to slide within the first tube;

a fourth tube telescopically positioned at least partially inside the second tube and configured to slide within the second tube; and a means for locking the fourth tube relative to the second tube; wherein the horizontal activity rail portion extends between the third tube and the fourth tube.

\* \* \* \* \*